United States Patent
Jang (10) Patent No.: US 11,018,356 B2
(45) Date of Patent: May 25, 2021

(54) HUMIDIFYING AND COOLING APPARATUS FOR FUEL CELL

(71) Applicant: Hanon Systems, Daejeon (KR)

(72) Inventor: Kil Sang Jang, Daejeon (KR)

(73) Assignee: Hanon Systems, Daejeon (KR)

( * ) Notice: Subject to any disclaimer, the term of this patent is extended or adjusted under 35 U.S.C. 154(b) by 33 days.

(21) Appl. No.: 16/316,401

(22) PCT Filed: Nov. 22, 2017

(86) PCT No.: PCT/KR2017/013310
§ 371 (c)(1),
(2) Date: Jan. 9, 2019

(87) PCT Pub. No.: WO2018/124483
PCT Pub. Date: Jul. 5, 2018

(65) Prior Publication Data
US 2019/0312290 A1    Oct. 10, 2019

(30) Foreign Application Priority Data

Dec. 27, 2016 (KR) .......................... 10-2016-0179845

(51) Int. Cl.
*H01M 8/04119* (2016.01)
*H01M 8/0267* (2016.01)
(Continued)

(52) U.S. Cl.
CPC ..... *H01M 8/04126* (2013.01); *H01M 8/0267* (2013.01); *H01M 8/04029* (2013.01); *H01M 8/04059* (2013.01); *H01M 8/04082* (2013.01); *H01M 8/04089* (2013.01); *H01M 8/04119* (2013.01); *H01M 8/04291* (2013.01);
(Continued)

(58) Field of Classification Search
CPC ......... H01M 8/04126; H01M 8/04082; H01M 8/04089; H01M 8/04049; H01M 8/04291; H01M 8/04119; H01M 8/0267; H01M 8/04059; H01M 8/04507; H01M 8/04731; H01M 8/04201; Y02P 70/50; Y02E 60/50
See application file for complete search history.

(56) References Cited

U.S. PATENT DOCUMENTS

2008/0182148 A1* 7/2008 Skala ................ H01M 8/04089
429/414
2010/0216040 A1* 8/2010 Kobayashi ............. F24F 3/1411
429/413
(Continued)

FOREIGN PATENT DOCUMENTS

KR    10-0748756 B1    8/2007
KR    20100076774 A    7/2010
(Continued)

*Primary Examiner* — Matthew T Martin
(74) *Attorney, Agent, or Firm* — Norton Rose Fulbright US LLP; James R. Crawford (57) ABSTRACT

The present invention relates to a humidifying and cooling apparatus for a fuel cell, and more particularly, to a humidifying and cooling apparatus for a fuel cell for actively and effectively performing a cooling and a humidification control of supplied air, when high-humidity air is supplied to a fuel cell stack in an air supplying apparatus for a fuel cell for supplying an appropriate humidity to the fuel cell stack.

18 Claims, 5 Drawing Sheets

(51) Int. Cl.
  *H01M 8/04007*  (2016.01)
  *H01M 8/04492*  (2016.01)
  *H01M 8/04701*  (2016.01)
  *H01M 8/04082*  (2016.01)
  *H01M 8/04089*  (2016.01)
  *H01M 8/04029*  (2016.01)
  *H01M 8/04291*  (2016.01)

(52) U.S. Cl.
  CPC ... *H01M 8/04507* (2013.01); *H01M 8/04731* (2013.01); *Y02P 70/50* (2015.11)

(56) References Cited

U.S. PATENT DOCUMENTS

| | | | | |
|---|---|---|---|---|
| 2013/0130135 | A1* | 5/2013 | Shim | H01M 8/04164 |
| | | | | 429/414 |
| 2014/0186725 | A1* | 7/2014 | Lee | H01M 8/04141 |
| | | | | 429/410 |
| 2015/0367279 | A1* | 12/2015 | Kim | H01M 8/04149 |
| | | | | 210/500.23 |
| 2017/0018787 | A1* | 1/2017 | Sanderson | H01M 8/04141 |
| 2017/0141417 | A1* | 5/2017 | Lucas | H01M 8/04156 |

FOREIGN PATENT DOCUMENTS

| | | |
|---|---|---|
| KR | 20120111169 A | 10/2012 |
| KR | 20140037481 A | 3/2014 |
| KR | 20150058814 A | 5/2015 |
| KR | 20150078420 A | 7/2015 |

* cited by examiner

HUMIDIFYING AND COOLING APPARATUS FOR FUEL CELL

This application is a national phase under 35 U.S.C. § 371 of International Application No. PCT/KR2017/013310 filed Nov. 22, 2017, which claims the benefit of priority from Korean Patent Application No. 10-2016-0179845 filed Dec. 27, 2016. The entire contents of these applications are incorporated herein by reference in their entirety.

TECHNICAL FIELD

The present invention relates to a humidifying and cooling apparatus for a fuel cell, and more particularly, to a humidifying and cooling apparatus for a fuel cell for actively and effectively performing a cooling and a humidification control of supplied air, when high-humidity air is supplied to a fuel cell stack in an air supplying apparatus for a fuel cell for supplying an appropriate humidity to the fuel cell stack.

BACKGROUND ART

A fuel cell system includes a fuel cell stack for generating electric energy, a fuel supplying system for supplying fuel (hydrogen) to the fuel cell stack, an air processing system (APS) for supplying oxygen in the air, which is an oxidizer required for the electrochemical reaction, to the fuel cell stack, a thermal and water management system (TMS) for controlling an operating temperature of the fuel cell stack, and the like.

A basic structure of the fuel cell system has a proton membrane electrode assembly (MEA) in which an electrode/catalyst and a gas diffusion layer are stacked in a sandwich shape while having a proton exchange membrane interposed therebetween, and the reaction gas such as hydrogen and oxygen is effectively brought into contact with the catalyst on the entire surface of the electrode/catalyst plate and the electrochemical reaction is thus performed to generate electricity.

That is, high-purity hydrogen is supplied from a hydrogen storage tank to an anode of the fuel cell during operation, air in the atmosphere is directly supplied to a cathode of the fuel cell using an air supplying apparatus including an air blower, the hydrogen supplied to the fuel cell stack is separated into hydrogen ions and electrons in the catalyst of the anode, the separated hydrogen ions pass to the cathode through an electrolyte membrane, and oxygen supplied to the cathode continuously combines with electrons entering the cathode through an external lead wire to thereby generate water and generate electrical energy.

In this case, the humidity in the proton membrane electrode assembly may be maintained by appropriately maintaining the humidity in the gas diffusion layer to thereby improve efficiency and performance of the fuel cell system.

Therefore, as a method for supplying and maintaining an appropriate humidity to the fuel cell system, a humidification technology through the air processing system (APS) is applied, and the air processing system includes a configuration of supplying air to the stack through an air filter, a silencer, an air blower, and a humidifier.

In addition, the heat and water management system (TMS) is a kind of cooling apparatus that keeps the fuel cell stack at a constant temperature (60 to 70 ° C.) while circulating distilled water through a cooling water channel between separators of the fuel cell stack.

The heat and water management system includes a reservoir in which the distilled water (hereinafter referred to as cooling water) is stored, a pump for circulating the cooling water to the inside and the outside of the fuel cell stack, an ion remover for removing metal ions from the cooling water circulating through the fuel cell stack, and a radiator for cooling the cooling water circulating through the fuel cell stack to circulate the cooling water again to the fuel cell stack.

Figure 1:
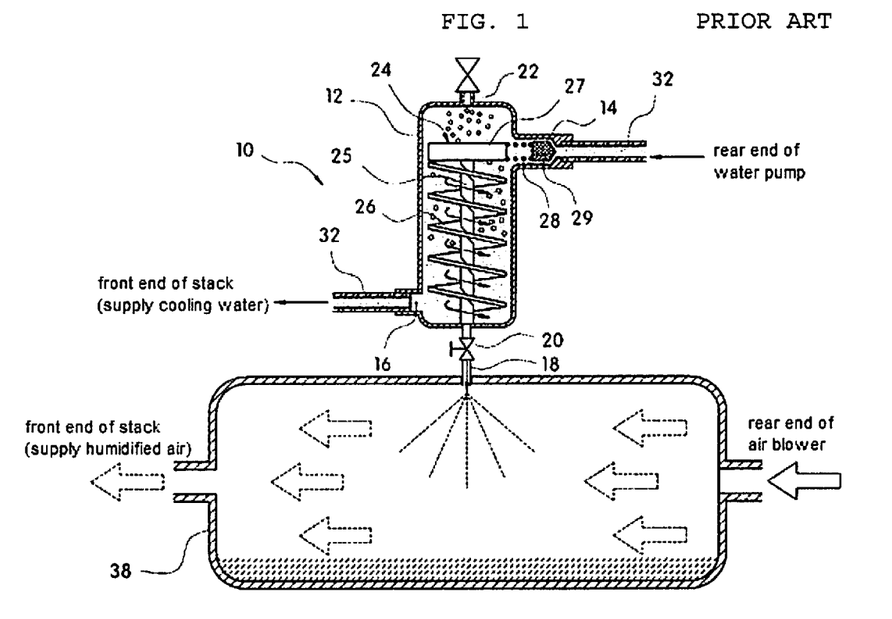
FIG. 1 is a conceptual view illustrating an air supplying apparatus for a fuel cell according to the related art.
Figure 2:
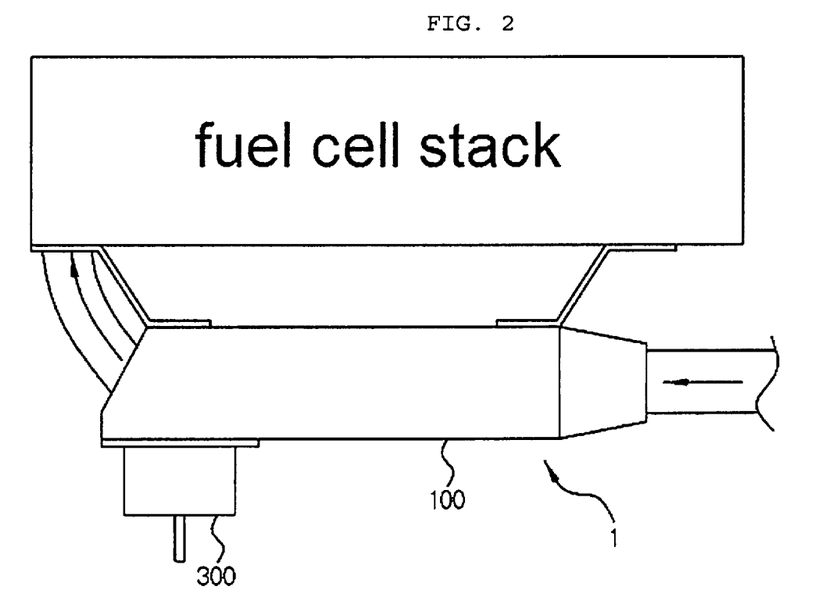
FIG. 2 is a front view schematically illustrating an appearance of a humidifying and cooling apparatus for a fuel cell according to an exemplary embodiment of the present invention.

As the related art, as illustrated in FIG. 1, Korean Patent Laid-Open Publication No. 2010-0058739 (published on Jun. 4, 2010, entitled "Air Separator for Fuel Cell") discloses an air separator for a fuel cell that may supply a cooling water from which air is removed to a humidifier by installing an air separator 10 for removing the air by reducing a flow rate of the cooling water and inducing a centrifugal force thereof in a section between a water pump and a radiator of a cooling water discharge line section of the fuel cell stack, and connecting the air separator 10 to the humidifier 38.

In this case, the air separator includes a body part 12 having a predetermined volume in which an inlet 14 to which a cooling water discharge line 32 from the water pump is connected is formed in an upper side thereof and an outlet 16 to which the cooling water discharge line 32 extending toward the radiator is connected is formed in a lower side thereof; a flow passage guide 24 integrally mounted in the body part 12 to reduce the flow rate of the cooling water and to induce the centrifugal force thereof; and an air deflation means 22 mounted on an upper end surface of the body part 12.

However, since the conventional air supplying system including the air separator for a fuel cell has a large volume of a humidifier and a cooling apparatus, there is a problem in that it is difficult to secure a space when being installed in a vehicle, the degree of freedom in design is lowered, and a flow of air in an engine room is interrupted to adversely affect cooling of other components.

In addition, a membrane type humidifying apparatus has a problem that it is difficult to control a humidification amount and reliability is lowered due to low pressure resistant of the humidifier.

RELATED ART DOCUMENT

Patent Document

Korean Patent No. 0748756 (registered on Aug. 6, 2007, entitled: EGR Cooler of EGR System for Vehicle).

DISCLOSURE

Technical Solution

An object of the present invention is to provide a humidifying and cooling apparatus for a fuel cell for actively and effectively performing a cooling and a humidification control of supplied air, when high-humidity air is supplied to a fuel cell stack in an air supplying apparatus for a fuel cell for supplying an appropriate humidity to the fuel cell stack.

In one general aspect, a humidifying and cooling apparatus 1 for a fuel cell that supplies humidified air to a cathode of a fuel cell stack 3 includes: a housing 100 including an air inlet 110 through which air is introduced from an air compressor 2 and an air outlet 120 through which the humidified air is discharged to the cathode of the fuel cell stack; a water spraying means 200 for spraying water into the housing 100; a reservoir 300 mounted on a lower end portion of the housing 100 and in which water settled in the housing 100 is drained through a drain hole 130 and is collected; and a recycling pipe 400 connected between the reservoir 300 and the water spraying means 200.

The humidifying and cooling apparatus 1 for a fuel cell may further include at least one or more hydrophilic evaporation means 500 mounted on a flow path of air introduced from the air inlet 110 to increase a contact area between water particles and air.

The water spraying means 200 may be disposed in the front of the hydrophilic evaporation means 500 in a flow direction of air, and spray the water in a direction opposite to the flow direction of air.

The humidifying and cooling apparatus 1 for a fuel cell may have the same number of the water spraying means 200 and the hydrophilic evaporation means 500.

The humidifying and cooling apparatus 1 for a fuel cell may include a water supplying pipe 600 that penetrates through a predetermined region of the housing 100 and radially extends in the housing 100, as a supplying passage of water connected between the recycling pipe 400 and the water spraying means 200.

A certain middle region of the region of the water supplying pipe 600 positioned in the housing 100 may be connected to the water spraying means 200.

The humidifying and cooling apparatus 1 for a fuel cell may have the water supplying pipe 600 insertedly coupled to a through hole 710 of a flange 700 coupled to the region penetrating through the housing 100, and may further include a sealing means 720 for sealing a space between the water supplying pipe 600 and the through hole 710.

The humidifying and cooling apparatus 1 for a fuel cell may include a pipe supporting part 140 that an end portion of the water supplying pipe 600 is insertedly fixed to an inner side surface of the housing 100.

The hydrophilic evaporation means 500 may be a porous membrane made of a hydrophilic material and be formed in a shape corresponding to a vertical cross section of the housing 100.

The hydrophilic evaporation means 500 may be coupled and fixed to an interior of the housing 100 by a wedge fixing part 150 protruding inwardly from the interior of the housing 100.

The hydrophilic evaporation means 500 may include a wedge penetration part 510 which is depressed inwardly such that a certain area of an outer circumferential surface thereof corresponds to a shape of the wedge fixing part 150.

The humidifying and cooling apparatus 1 for a fuel cell may include an outlet pipe 160 that is in communication with the air outlet 120 and protrudes to the inside of the housing 100, and the outlet pipe 160 may have a funnel shape in which a diameter thereof gradually increases toward the inside direction of the housing 100.

The humidifying and cooling apparatus 1 for a fuel cell may have an evaporation assist means 310 formed of a hydrophilic material which is mounted in the reservoir 300 or on the drain hole 130 side so that water settled on a lower side of the housing 100 is moved upwardly and evaporated.

The humidifying and cooling apparatus 1 for a fuel cell may further include a water pump 410 on the recycling pipe 400.

At least one or more water spraying means 200 may be disposed in the form of a nozzle on one side or both sides of the air inlet 110 in a width direction.

In another general aspect, an air supplying apparatus for a fuel cell includes: the humidifying and cooling apparatus 1 for a fuel cell of any one of claims 1 to 15; the air compressor 2 supplying air to the air inlet 110 of the humidifying and cooling apparatus 1 for a fuel cell; and the fuel cell stack 3 in which the humidified air supplied from the air outlet 120 of the humidifying and cooling apparatus 1 is introduced into the cathode.

Advantageous Effects

The humidifying and cooling apparatus for a fuel cell according to the exemplary embodiment of the present invention has an advantage that the cooling and the humidification control of the supplied air may be actively and effectively performed when high-humidity air is supplied to the fuel cell stack in the air supplying apparatus for a fuel cell for supplying an appropriate humidity to the fuel cell stack.

More specifically, in the air supplying apparatus for a fuel cell, a large amount of air needs to be supplied for power generation of the fuel cell, and there is a need for a cooling apparatus for cooling the air which is compressed by the air compressor and is heated and a humidifying apparatus for controlling the humidity of the air supplied to the stack.

The present invention provides an apparatus in which the conventional cooling apparatus and the humidifying apparatus are incorporated, and when a temperature of air is increased by the air compressor, the apparatus may spray water to lower the temperature of air and adjust the humidity at the same time, thereby simplifying the configuration of the apparatus and reducing the volume and cost.

Further, according to the present invention, a recirculating pipe for collecting unused water from the water used for humidification and cooling in the reservoir and supplying the collected water again to the water spraying means is provided, and some of the unused water is evaporated by an evaporation assist means provided in the reservoir, thereby minimizing the water discarded to the outside through a recycling of water.

In addition, according to the present invention, the water sprayed from the water spraying means is sprayed in a direction opposite to the flow of air and a hydrophilic evaporation means is further provided for increasing a contact area between the water particles and the air, thereby improving an output and reliability of the stack through an increase in a humidification function.

BEST MODE

Hereinafter, a humidifying and cooling apparatus for a fuel cell according to an exemplary embodiment of the present invention will be described in detail with reference to the accompanying drawings.

A humidifying and cooling apparatus 1 for a fuel cell according to an exemplary embodiment of the present invention is to actively and effectively perform a cooling and a humidification control of supplied air, when high-humidity air is supplied to a fuel cell stack 3 in an air supplying apparatus for a fuel cell for supplying an appropriate humidity to the fuel cell stack 3.

Figure 3:
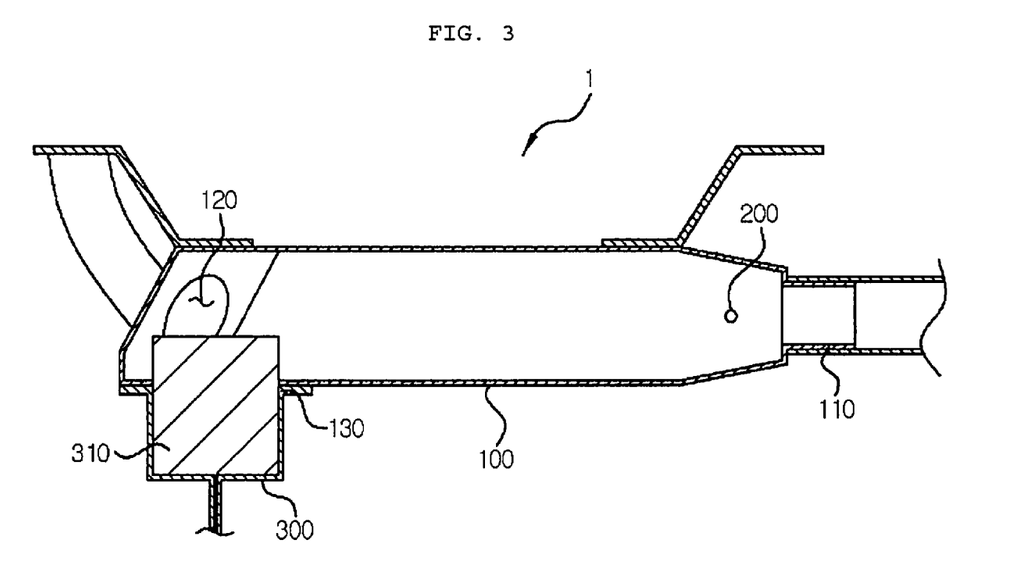
FIGS. 3 and 4 are a cross-sectional view and a perspective view schematically illustrating an interior of a humidifying and cooling apparatus for a fuel cell according to a first exemplary embodiment of the present invention.

As illustrated in FIG. 3, the humidifying and cooling apparatus 1 for a fuel cell according to an exemplary embodiment of the present invention generally includes a housing 100, a water spraying means 200, a reservoir 300, and a recycling pipe 400.

First, the housing 100 includes an air inlet 110 through which air is introduced from an air compressor 2 and an air outlet 120 through which humidified air is discharged to a cathode of the fuel cell stack 3, and includes a space in which the air flows therein.

Figure 4:
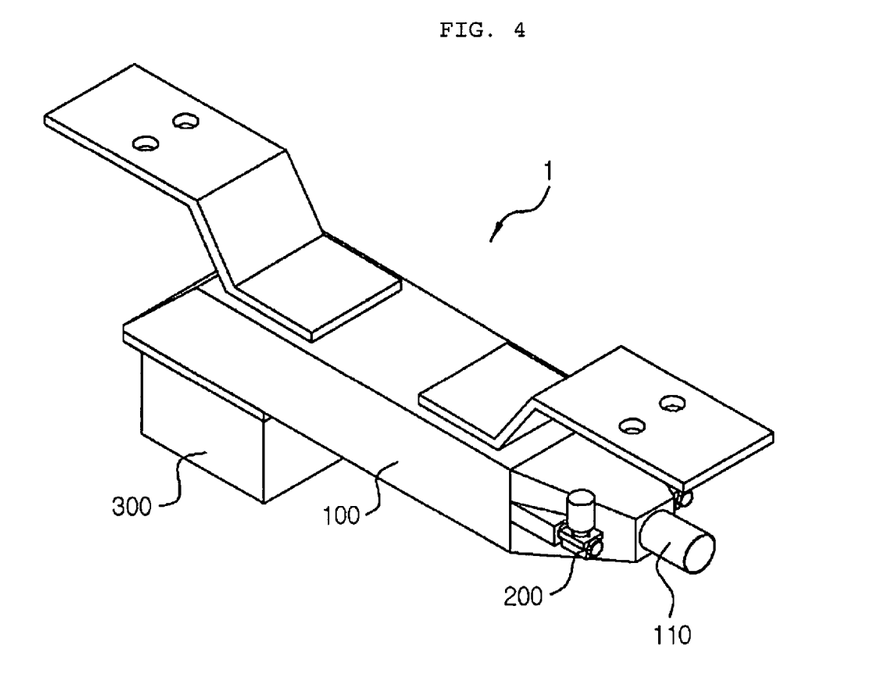
Figure 5:
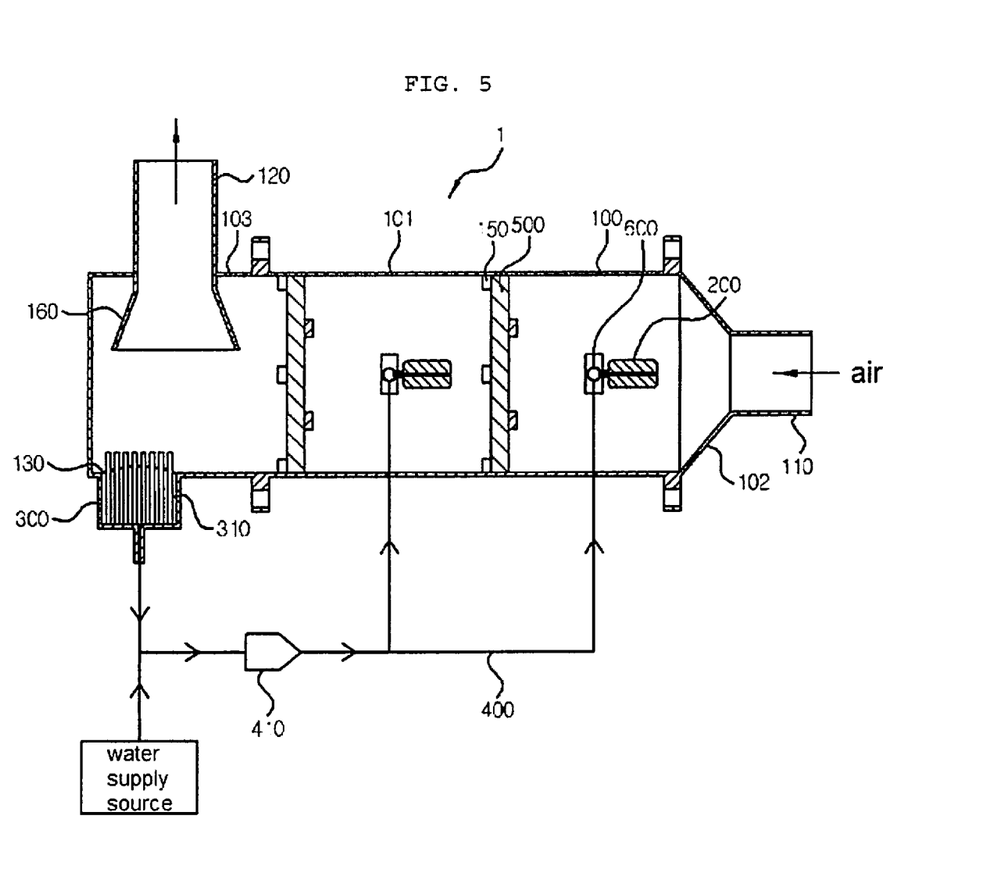
FIG. 5 is a cross-sectional view illustrating a humidifying and cooling apparatus for a fuel cell according to a second exemplary embodiment of the present invention.

As illustrated in FIGS. 3 to 5, the housing 100 may be formed in a substantially cylindrical shape, and may have a structure in which a first tank part 102 through which the air is introduced and a second tank part 103 through which the air is discharged are coupled to both ends of a cylindrical body part 101.

Here, the first tank part 102 may be bolted or brazed to one side of the body part 101, and may have a funnel shape in which a diameter thereof gradually increases as a distance from the air inlet 110 through which the air is introduced is increased.

Next, the water spraying means 200 is to spray water into the housing 100 and may be in the form of a nozzle.

Here, the humidifying and cooling apparatus 1 for a fuel cell includes a reservoir 300 mounted on a lower end portion of the housing 100 and in which water settled in the housing 100 is drained through a drain hole 130 and is collected, and a recycling pipe 400 connected between the reservoir 300 and the water spraying means 200, thereby having a structure capable of minimizing the water discarded to the outside.

A water pump 410 is further provided on the recycling pipe 400 to allow the water in the reservoir 300 to be smoothly supplied to the water spraying means 200.

As an example of the humidifying and cooling apparatus 1 for a fuel cell having the configuration as described above, a humidifying and cooling apparatus 1 for a fuel cell according to a first exemplary embodiment of FIGS. 3 and 4 has a structure in which the water spraying means 200 is disposed one by one on both sides of the air inlet 110 in a width direction and moisture is supplied in the same direction as the air to be introduced.

An operation process of the humidifying and cooling apparatus 1 for a fuel cell illustrated in FIGS. 3 and 4 will be described.

In the humidifying and cooling apparatus 1 for a fuel cell, when the air is introduced into the housing 100 through the air inlet 110 formed in one side in a length direction, the water is sprayed from the water spraying means 200 having the form of the nozzle disposed on both sides of the air inlet 110 and is evaporated, such that high-humidity air is discharged to the air outlet 120.

Here, in the humidifying and cooling apparatus 1 for a fuel cell, an evaporation assist means 310 formed of a hydrophilic material may be mounted in the reservoir 300 or on the drain hole 130 side so that the water settled on the lower side of the housing 100 is moved upwardly and evaporated.

The evaporation assist means 310 may be a wick installed in a water droplet trap, and serves to allow the water below the wick to move up to an upper side of the wick and to be evaporated well.

Accordingly, in the humidifying and cooling apparatus 1 for a fuel cell, high temperature and high pressure air compressed in the air compressor 2 is introduced into the air inlet 110, and high-humidity air is supplied to a cathode of the fuel cell through the air outlet 120 through the process as described above.

The humidifying and cooling apparatus 1 for a fuel cell may include an outlet pipe 160 that is in communication with the air outlet 120 and protrudes to the inside of the housing 100, and the outlet pipe 160 may be disposed to be positioned on an upper side of the evaporation assist means 310 and may have a funnel shape in which a diameter thereof gradually increases toward the inside direction of the housing 100.

Thereby, the humidifying and cooling apparatus 1 for a fuel cell may prevent water flowing along a wall surface of the housing 100 from flowing out to the outlet pipe 160, which allows the water to be rolled through the flow of air without flowing to the outlet pipe 160, thereby increasing an evaporation amount.

Figure 6:
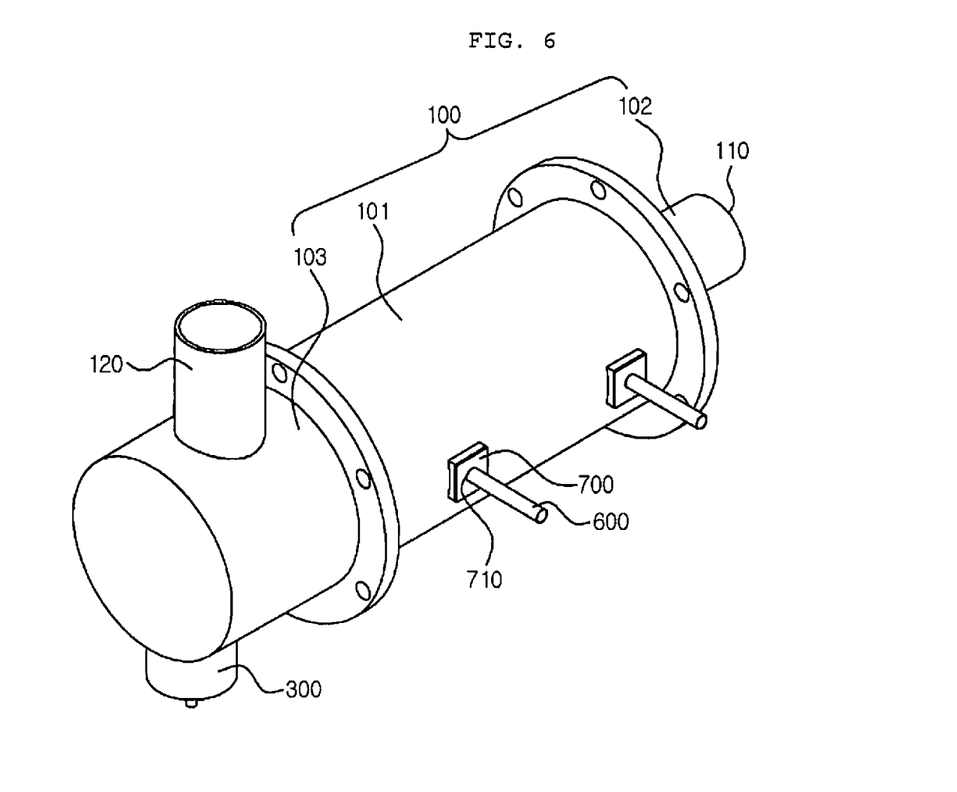
FIG. 6 is a perspective view illustrating the humidifying and cooling apparatus for a fuel cell according to the second exemplary embodiment of the present invention.
Figure 7:
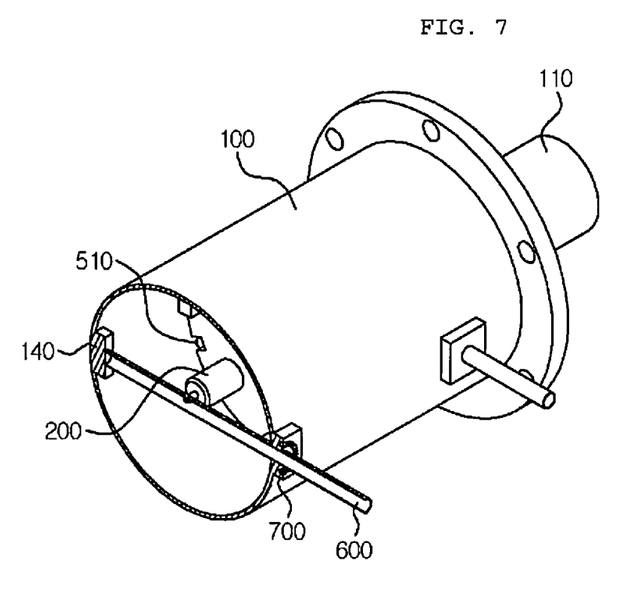
FIG. 7 is a perspective view in a cross section direction taken along a direction aa' in FIG. 6.
Figure 8:
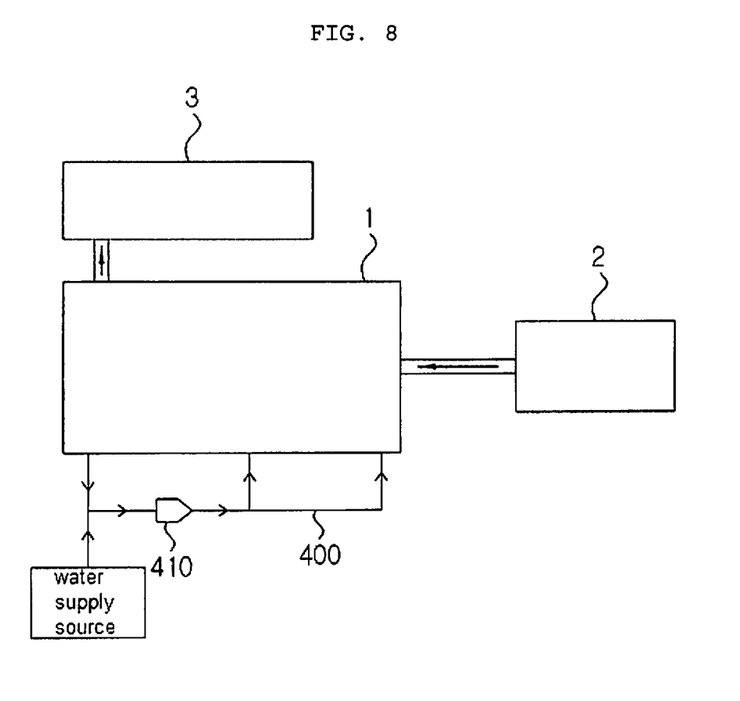
FIG. 8 is a configuration view of a humidifying and cooling apparatus for a fuel cell according to an exemplary embodiment of the present invention.

Meanwhile, FIGS. 5 to 7 illustrate a humidifying and cooling apparatus 1 for a fuel cell according to a second exemplary embodiment, and hereinafter, a description will be provided based on the humidifying and cooling apparatus 1 for a fuel cell according to the second exemplary embodiment.

As illustrated in FIG. 5, the humidifying and cooling apparatus 1 for a fuel cell may include at least one or more hydrophilic evaporation means 500 mounted on a flow path of air introduced from the air inlet 110 to increase a contact area between water particles and air.

The hydrophilic evaporation means 500 may be in the form of a porous membrane made of a hydrophilic material, and may be variously modified as long as it is formed of a material having high hydrophilic property.

In addition, the hydrophilic evaporation means 500 is formed in a shape corresponding to a vertical cross section of the housing 100 so that all the air flowing in the length direction in the housing 100 passes through the hydrophilic evaporation means 500.

In a case in which a plurality of hydrophilic evaporation means 500 are provided, it is preferable that the plurality of hydrophilic evaporation means 500 are mounted to be spaced apart from each other by a predetermined interval in the length direction of the housing 100.

Further, the hydrophilic evaporation means 500 is fixed and coupled to an interior of the housing 100 by a wedge fixing part 150 protruding inwardly from the interior of the housing 100.

Here, the hydrophilic evaporation means 500 includes a wedge penetration part 510 which is depressed inwardly such that a certain area of an outer circumferential surface thereof corresponds to a shape of the wedge fixing part 150, and therefore, when the hydrophilic evaporation means 500 is inserted into one side of the interior of the housing 100, the wedge fixing part 150 is inserted into the wedge penetration part 510 so as to pass through the wedge penetration part 510 and is then rotated.

Thereafter, the hydrophilic evaporation means 500 is fixed to the housing 100 with a strong force by the wedge fixing part 150 of the wedge structure.

Meanwhile, the water spraying means 200 may be disposed in the front of the hydrophilic evaporation means 500 in the flow direction of the air to spray the water in a direction opposite to the flow direction of the air, thereby increasing a contact area between the water particles and the air.

That is, the humidifying and cooling apparatus 1 for a fuel cell is configured to hold water droplets by the hydrophilic evaporation means 500 or the wick to maintain the contact surface wider and to re-evaporate the moisture contained in the hydrophilic evaporation means 500 through a rapid flow of air introduced from the air inlet 110, thereby increasing a humidification effect.

Here, unevaporated water is discharged through the drain hole 130, is collected in the reservoir 300, and is then recirculated through the water spraying means 200 along the recycling pipe 400.

As illustrated in FIGS. 5 and 6, it is preferable that the humidifying and cooling apparatus 1 for a fuel cell has the same number of the water spraying means 200 and the hydrophilic evaporation means 500.

Therefore, the water sprayed through the water spraying means 200 is sprayed as if sprayed from the front to the rear, and in this case, the sprayed water droplets are left on the hydrophilic evaporation means 500 located at the rear and are heat exchanged with the air flowing at high speed while the contact surface is kept wide, thereby performing evaporation.

Meanwhile, as illustrated in FIGS. 5 and 6, the humidifying and cooling apparatus 1 for a fuel cell may include a water supplying pipe 600 that penetrates through a predetermined region of the housing 100 and radially extends in the housing 100, as a supplying passage of water connected between the recycling pipe 400 and the water spraying means 200.

A certain middle region of the region of the water supplying pipe 600 positioned in the housing 100 is connected to the water spraying means 200. Accordingly, the water supplied to the water supplying pipe 600 through the recycling pipe 400 may be sprayed to the water spraying means 200.

In the humidifying and cooling apparatus 1 for a fuel cell, a flange 700 is coupled to a region that the water supplying pipe 600 penetrates through the housing 100, and the water supplying pipe 600 is insertedly coupled to a through hole 710 formed in the flange 700.

Here, a sealing means 720 in the form of an O-ring may be further provided between the water supplying pipe 600 and the through hole 710 so that air and moisture inside the housing 100 are not leaked to the outside.

Further, the humidifying and cooling apparatus 1 for a fuel cell may include a pipe supporting part 140 that an end portion of the water supplying pipe 600 is insertedly fixed to an inner side surface of the housing 100 so that the water supplying pipe 600 may be stably fixed at a certain position in the housing 100.

The pipe supporting part 140 has a shape having an inner side depressed to correspond to the end portion of the water supplying pipe 600, and the end portion of the water supplying pipe 600 is insertedly fixed thereto, thereby preventing the water supplying pipe 600 from being vibrated by the flow of air.

Accordingly, according to the present invention, the recycling pipe 400 for collecting the unused water of the water supplied for humidification and cooling in the reservoir 300 and again supplying the collected water to the water spraying means 200 is provided, and some of the unused water is evaporated by the evaporation assist means 310 provided in the reservoir 300, thereby making it possible to minimize the water discarded to the outside through a recycling of water.

In addition, the water sprayed from the water spraying means 200 is sprayed in a direction opposite to the flow of air and the hydrophilic evaporation means 500 is further provided for increasing the contact area between the water particles and the air, thereby improving an output and reliability of the stack through an increase in a humidification function.

The present invention is not limited to the above-mentioned exemplary embodiments but may be variously applied, and may be variously modified by those skilled in the art to which the present invention pertains without departing from the gist of the present invention claimed in the claims.

DETAILED DESCRIPTION OF MAIN ELEMENTS

1: humidifying and cooling apparatus for a fuel cell
2: air compressor
3: fuel cell stack
100: housing
101: body part
102: first tank part
103: second tank part
110: air inlet
120: air outlet
130: drain hole
140: pipe supporting part
150: wedge fixing part
160: outlet pipe
200: water spraying means
300: reservoir
310: evaporation assist means
400: recycling pipe
410: water pump
500: hydrophilic evaporation means
510: wedge penetration part
600: water supplying pipe
700: flange
710: through hole
720: sealing means

The invention claimed is:

1. A humidifying and cooling apparatus for a fuel cell that supplies humidified air to a cathode of a fuel cell stack in an air supplying apparatus for a fuel cell, the humidifying and cooling apparatus for a fuel cell comprising:
  a housing including an air inlet through which air is introduced from an air compressor and an air outlet through which the humidified air is discharged to the cathode of the fuel cell stack;
  a nozzle for spraying water into the housing;
  a reservoir mounted on a lower end portion of the housing and in which water settled in the housing is drained through a drain hole and is collected;
  a recycling pipe connected between the reservoir and the nozzle; and
  a porous membrane comprising a hydrophilic material mounted on a flow path of air introduced from the air inlet to increase a contact area between water particles and air, wherein the nozzle is disposed on an upside stream of the porous membrane in a flow direction of air, and sprays the water in a direction opposite to the flow direction of air.

2. The humidifying and cooling apparatus for a fuel cell claim 1, wherein the humidifying and cooling apparatus for a fuel cell has the same number of the nozzle and the porous membrane.

3. The humidifying and cooling apparatus for a fuel cell of claim 1, wherein the humidifying and cooling apparatus for a fuel cell includes a water supplying pipe that penetrates through a predetermined region of the housing and radially extends in the housing, as a supplying passage of water connected between the recycling pipe and the nozzle.

4. The humidifying and cooling apparatus for a fuel cell of claim 3, wherein a certain middle region of the region of the water supplying pipe positioned in the housing is connected to the nozzle.

5. The humidifying and cooling apparatus for a fuel cell of claim 3, wherein the humidifying and cooling apparatus for a fuel cell has the water supplying pipe insertedly coupled to a through hole of a flange coupled to the region penetrating through the housing, and further includes a seal a space between the water supplying pipe and the through hole is further provided.

6. The humidifying and cooling apparatus for a fuel cell of claim 5, wherein the humidifying and cooling apparatus for a fuel cell includes a pipe supporting part that an end portion of the water supplying pipe is insertedly fixed to an inner side surface of the housing.

7. The humidifying and cooling apparatus for a fuel cell of claim 1, wherein the porous membrane is formed in a shape corresponding to a vertical cross section of the housing.

8. The humidifying and cooling apparatus for a fuel cell of claim 7, wherein the porous membrane is coupled and fixed to an interior of the housing by a wedge fixing part protruding inwardly from the interior of the housing.

9. The humidifying and cooling apparatus for a fuel cell of claim 8, wherein the porous membrane includes a wedge penetration part which is depressed inwardly such that a certain area of an outer circumferential surface thereof corresponds to a shape of the wedge fixing part.

10. The humidifying and cooling apparatus for a fuel cell of claim 1, wherein the humidifying and cooling apparatus for a fuel cell includes an outlet pipe that is in communication with the air outlet and protrudes to the inside of the housing, and the outlet pipe has a funnel shape in which a diameter thereof gradually increases toward the inside direction of the housing.

11. The humidifying and cooling apparatus for a fuel cell of claim 1, wherein the humidifying and cooling apparatus for a fuel cell has an evaporation assist means comprising a hydrophilic material that is mounted in the reservoir or on the drain hole side so that water settled on a lower side of the housing is moved upwardly and evaporated.

12. The humidifying and cooling apparatus for a fuel cell of claim 1, wherein the humidifying and cooling apparatus for a fuel cell further includes a water pump on the recycling pipe.

13. The humidifying and cooling apparatus for a fuel cell of claim 1, wherein at least one or more nozzle are disposed in the form of a nozzle on one side or both sides of the air inlet in a width direction.

14. An air supplying apparatus for a fuel cell comprising:
the humidifying and cooling apparatus for a fuel cell of claim 1;
the air compressor supplying air to the air inlet of the humidifying and cooling apparatus for a fuel cell; and
the fuel cell stack in which the humidified air supplied from the air outlet of the humidifying and cooling apparatus is introduced into the cathode.

15. An air supplying apparatus for a fuel cell comprising:
the humidifying and cooling apparatus for a fuel cell of claim 2;
the air compressor supplying air to the air inlet of the humidifying and cooling apparatus for a fuel cell; and
the fuel cell stack in which the humidified air supplied from the air outlet of the humidifying and cooling apparatus is introduced into the cathode.

16. An air supplying apparatus for a fuel cell comprising:
the humidifying and cooling apparatus for a fuel cell of claim 3;
the air compressor supplying air to the air inlet of the humidifying and cooling apparatus for a fuel cell; and
the fuel cell stack in which the humidified air supplied from the air outlet of the humidifying and cooling apparatus is introduced into the cathode.

17. The humidifying and cooling apparatus for a fuel cell of claim 5, wherein the seal is an O-ring.

18. The humidifying and cooling apparatus for a fuel cell of claim 11, wherein the evaporation assist means comprises a wick installed in a water droplet trap.

* * * * *